United States Patent

[11] 3,614,415

| [72] | Inventor | Alfred E. Edelman<br>Camden, N.J. |
|---|---|---|
| [21] | Appl. No. | 825,665 |
| [22] | Filed | May 19, 1969 |
| [45] | Patented | Oct. 19, 1971 |
| [73] | Assignee | Vicon Products Corporation<br>Mamaroneck, N.Y. |

[54] FIBER ILLUMINATOR
6 Claims, 5 Drawing Figs.

[52] U.S. Cl. .................................................. 240/2.18,
32/27, 32/69, 240/1 EL, 240/2 E, 240/2 MT
[51] Int. Cl. ...................................................... F21l 1/00
[50] Field of Search .......................................... 240/6.46,
2.18, 2.18 X; 350/96 B; 32/27

[56] References Cited
UNITED STATES PATENTS

| 3,397,457 | 8/1968 | Gosselin .................. | 32/27 |
| 2,885,537 | 5/1959 | Wood, Jr. .................. | 240/6.46 |
| 3,131,690 | 5/1964 | Innis et al. .................. | 240/2.18 X |
| 2,539,828 | 1/1951 | Goldis et al. .................. | 240/2.18 |
| 1,642,187 | 9/1927 | Young, Jr. .................. | 240/1 |
| 3,498,692 | 5/1970 | Jewitt et al. .................. | 240/6.46 X |

*Primary Examiner*—Samuel S. Matthews
*Assistant Examiner*—Russell E. Adams, Jr.
*Attorney*—Lerner, David & Littenberg ABSTRACT: A fiber illuminator especially suitable for interoral use by dentists for illuminating the interoral cavity. Light is carried along a flexible bundle of fibers from a light source to a primary light probe and the primary probe is removably connected to various instruments for directing light onto a work area during use of the instruments. The primary light probe is securely connected to an instrument by an arrangement which permits a quick disconnect and which guides the bundle of fibers away from the hand of the operator so that the instrument may be held normally.

PATENTED OCT 19 1971
3,614,415
FIG.1
FIG.3
FIG.2
FIG.4
FIG.5
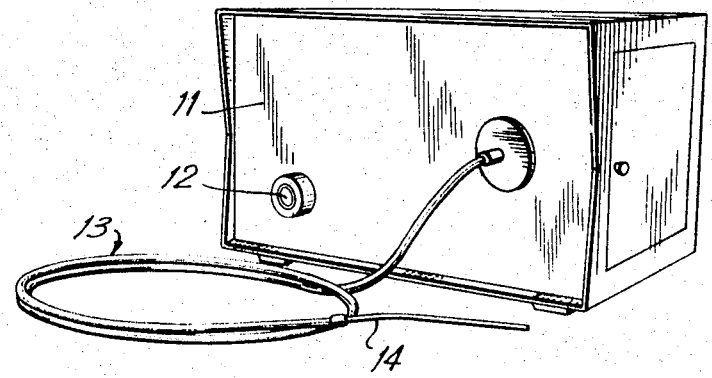
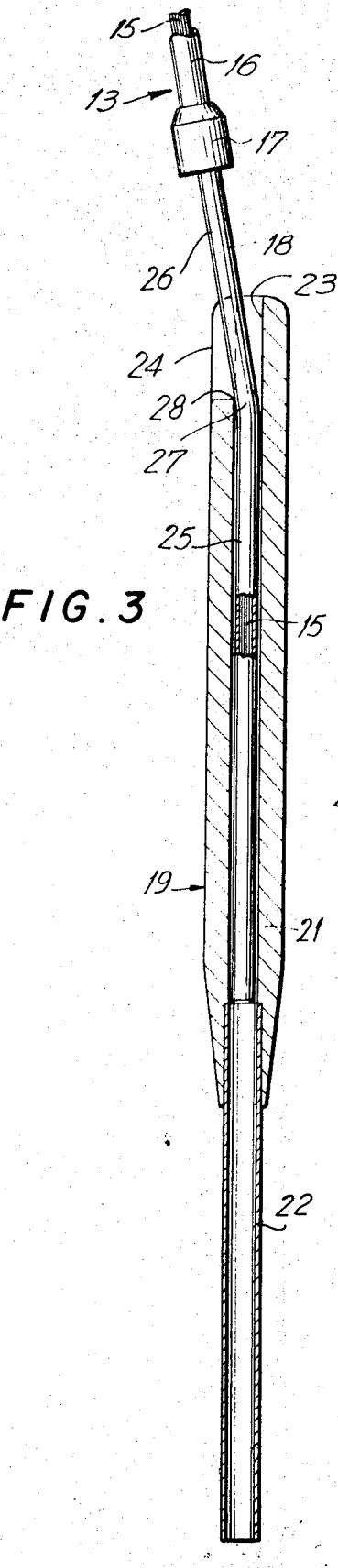
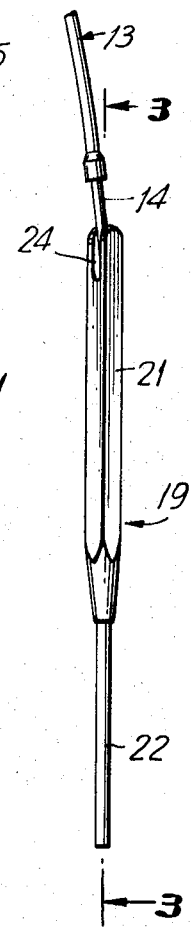
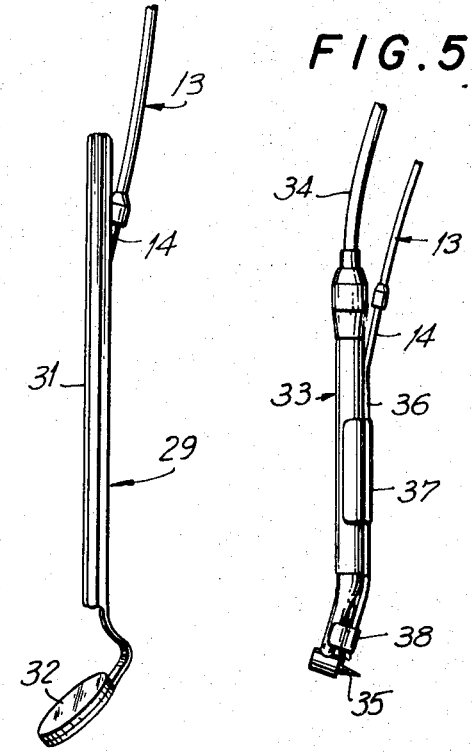
INVENTOR.
ALFRED E. EDELMAN
BY
Blum, Moscowitz, Friedman & Kaplan
ATTORNEYS

FIBER ILLUMINATOR

BACKGROUND OF THE INVENTION

This invention relates generally to a fiber illuminator of the type especially suitable for use by dentists for illuminating the inter-oral cavity. In the art, apparatus for transmitting light along a fiber bundle has been awkward to work with because of the length of the bundle and the manner in which the instruments cooperate with the fiber bundle. Also, in order to securely connect the instrument to the fiber bundle, it has been necessary, in some instances, to permanently connect the instrument and bundle, while in other instances, unnecessarily complex apparatus has been required for connecting the instrument to the bundle.

SUMMARY OF THE INVENTION

Generally speaking, in accordance with the invention, a fiber bundle leading from a light source has a primary light probe permanently affixed thereto. The primary light probe can be quickly and securely connected to a wide variety of instruments in such a manner that the bundle will not interfere with manipulation of the instrument and in a manner to permit quick disconnection of the instrument from the primary light probe.

Accordingly, it is an object of this invention to provide an improved fiber illuminator especially suitable for illuminating the inter-oral cavity while operations are being performed therein.

Another object of the invention is to provide a fiber illuminator with an improved primary light probe having improved means for connecting the primary light probe to a variety of instruments.

A further object of the invention is to provide an improved primary light probe and instrument connect and disconnect arrangement.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWING

For a fuller understanding of the invention, reference is had to the following description taken in connection with the accompanying drawing, in which:

FIG. 1 is a perspective view of a fiber illuminator including a primary light probe constructed in accordance with a preferred embodiment of the instant invention;

FIG. 2 is an elevational view of a primary light probe of the instant invention connected to one form of hand held instrument;

FIG. 3 is a sectional view, at an enlarged scale, taken along line 3—3 of FIG. 2.

FIG. 4 is an elevational view of a primary light probe connected to another type of instrument; and FIG. 5 is an elevational view of a primary light probe connected to still another type of instrument.

DESCRIPTION OF THE PREFERRED EMBODIMENTS

Referring to FIG. 1, the fiber illuminator includes a housing 11 wherein is mounted a light source (not shown) externally operated by a control 12. A fiber bundle indicated generally at 13 is connected at one end to housing 11 and is formed at the other end into a primary light probe 14. As best seen in FIG. 3, fiber bundle 13 includes closely packed fibers 15 and a flexible sheath or casing 16 which protects the fibers. Casing 16 is secured to a collar 17 at one end of a tube 18 and the fibers extend through collar 17 and tube 18 and terminate at the end of tube 18.

Fiber bundle 13 with its fibers and casing are flexible and can be coiled up as shown in FIG. 1 or extended to bring light to the desired area remote from housing 11. Tube 18 is preferably formed of metal for ease of cleaning and is substantially rigid.

To tube 18 may be connected a wide variety of instruments which are used to illuminate, examine or operate in the inter-oral cavity. One such instrument is shown in FIGS. 2 and 3. The instrument 19, which may be termed a transilluminator permits a dental assistant to direct light on a particular work area while the dentist is operating on the area. Transilluminator 19 includes a handle 21 and a tube 22 coaxial with handle 21. Handle 21 includes a cylindrical passage 23 which communicates at one end with tube 22 and which extends outwardly through the top end of handle 21. A slot 24 extends through a wall of handle 21 proximate the top end of the handle and communicates with cylindrical passage 23. The inside diameter of cylindrical passage 23 is approximately the same as the outside diameter of tube 18. The inside diameter of the cylindrical passage is preferably slightly larger than the outside diameter of the tube so that the tube may be easily inserted in the cylindrical passage. The width of slot 24 taken transversely of the longitudinal axis of passage 23 is approximately the same as the major diameter of passage 23.

Tube 18 defines a straight section 25 and a straight section 26 with the longitudinal axis of each straight section intersecting at an angle at the area indicated at 27.

When it is desired to mount transilluminator 19 on tube 18, straight section 25 is first inserted in cylindrical passage 23 and the transilluminator is oriented so that continued insertion of tube 18 permits straight section 26 to enter slot 24. By a slight force during insertion, the intersecting edge 28 of slot 24 and cylindrical passage 23 will bear against the area of intersection 27 and slightly deflect straight section 26 to thereby frictionally retain tube 18 in the transilluminator. To remove the primary light probe from the transilluminator, it is merely necessary to grasp collar 17 and physically withdraw the primary light probe.

It will be noted that fiber bundle 13 meets the longitudinal axis of the transilluminator at an angle thereto. With such arrangement, the operator or dental assistant holding the transilluminator will find that the light bundle trails away from her hand and does not obstruct or interfere with manipulation of the transilluminator.

The foregoing means for releasably connecting the primary light probe to the hand-held instrument may be utilized for a variety of instruments. In FIG. 4 there is shown a hand-held mirror 29 having a handle 31 and a reflector 32. As with transilluminator 19, a cylindrical passage extends down through handle 31 and receives straight section 25 of the primary light probe. The upper end of the handle is provided with a slot 24 for receiving straight section 26 of the primary light probe to cause the bundle to trail away from handle 31 and also cause frictional engagement of the primary light probe with the handle.

In FIG. 5 there is shown a dental hand piece 33 which may be air-operated drill powered by compressed air delivered through tube 34 in order to rotate drill bit 35. A tube 36 which generally follows the contour of the hand piece is provided with clips 37 and 38 for securing tube 36 to the hand piece. Tube 36 is provided with a cylindrical passage and a slot of the type described in connection with FIG. 3 for receiving and supporting primary probe 14. Within the end of tube 36 proximate to drill bit 35 may be a bundle of fibers to carry the light to the working area of the drill from the end of the fibers in the primary light probe.

From the foregoing description, it is seen that the various instruments have in common a passage and a slot which receive therein the primary light probe in order to frictionally retain the probe within the instrument and to guide the bundle of fibers away from the longitudinal axis of the handle of the instrument.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawing shall be interpreted as illustrative and not in a limiting sense.

What is claimed is:

1. In a fiber illuminator, in combination, a light source, a flexible fiber optic bundle, a relatively rigid primary light probe comprising a straight portion forming one end of said probe and a further portion connected to said straight portion and disposed at an angle relative thereto, one end of said fiber optic bundle terminating in said straight portion of said probe and the other end of said fiber optic bundle being disposed adjacent said light source, and an instrument having a longitudinal passage adapted to snugly receive said straight portion of said probe, said longitudinal passage being at least slightly longer than said straight portion to permit at least the juncture between said straight portion and said further portion of said probe to be inserted into said passage such that due to the angle between said straight and further portions and the fact that said longitudinal passage is adapted to only snugly receive said straight portion, a slight deflection of said further portion relative to said straight portion is effected when said juncture therebetween is forced into said longitudinal passage whereby a secure and releasable frictional interengagement between said instrument and probe is effected.

2. The combination as claimed in claim 1, wherein said instrument comprises a slot having a longitudinal axis which is parallel to the longitudinal axis of said longitudinal passage, said slot being connected to said longitudinal passage and having a width such that said further portion of said probe can be slidably and snugly received within said slot.

3. The combination as claimed in claim 2, wherein the connection between said slot and said longitudinal passage defines an intersecting edge adapted to engage said probe in the area of the juncture between said straight portion and further portion of said probe to effect said slight deflection thereof and thereby effect said releasable interengagement between said probe and said instrument.

4. The combination as claimed in claim 3, wherein said longitudinal passage extends through one end of said instrument and said slot extends from said one end of said instrument to a point disposed intermediate of the ends of said instrument.

5. The combination as claimed in claim 4, wherein said further portion is a straight portion.

6. The combination as claimed in claim 5, wherein said instrument is a dental instrument.